US008244063B2

(12) United States Patent
Shechtman et al.

(10) Patent No.: US 8,244,063 B2
(45) Date of Patent: Aug. 14, 2012

(54) SPACE-TIME BEHAVIOR BASED CORRELATION

(75) Inventors: Eli Shechtman, Rehovot (IL); Michal Irani, Rehovot (IL)

(73) Assignee: Yeda Research & Development Co. Ltd. at the Weizmann Institute of Science, Rehovot (IL)

( * ) Notice: Subject to any disclaimer, the term of this patent is extended or adjusted under 35 U.S.C. 154(b) by 1401 days.

(21) Appl. No.: 11/401,449

(22) Filed: Apr. 11, 2006

(65) Prior Publication Data

US 2007/0237419 A1    Oct. 11, 2007

(51) Int. Cl.
*G06K 9/64* (2006.01)
(52) U.S. Cl. ........................................ 382/278; 382/178
(58) Field of Classification Search .................. 382/154
See application file for complete search history.

(56) References Cited

OTHER PUBLICATIONS

Greenspan et al: "Probabilistic space-time video modeling via piecewise GMM", IEEE-PAMI, 2004.*
Wang et al: Accurate optical flow estimation in noisy sequences by robust tensor-driven anisotropic diffusion, IEEE, 2005.*
Ke et al: "Efficient visual event detection using volumetric features", Proc. Intl. conference on Computer vision, 2005.*
Medioni et al: "Event detection and analysis from video streams", IEEE-PAMI, 2001.*
Viola et al: "Detection pedestrians using patters of motion and appearance", IEEE-ICCV, 2003.*
M. J. Black, "Explaining Optical Flow Events With Parameterized Spatio-Temporal Models", *CVPR*, 1999.
A. Bobick and J. Davis, "The Recognition of Human Movement Using Temporal Templates", *PAMI*, 2001, 23(3):257-267.
C. Bregler, "Learning and Recognizing Human Dynamics in Video Sequences", *CVPR*, Jun. 1997, 257-267, San Juan, Puerto Rico.
O. Chomat and J. L. Crowley, "Probabilistic Sensor for the Perception of Activities", *ECCV*, 2000, 314-319.
A. A. Efros, A. C. Berg, G. Mori and J. Malik, "Recognizing Action at a Distance", *ICCV*, Oct. 2003.
C. Harris, M. Stephens, "A Combined Corner and Edge Detector", In *4th Alvey Vision Conference*, 1988, pp. 147-151.
Lucas, T. Kanade, "An Iterative Image Registration Technique With an Application to Stereo Vision", *IUworkshop*, pp. 121-130, *IUW*, 1981.
S. A. Niyogi, E. H. Adelson, "Analyzing and Recognizing Walking Figures in XYT", *CVPR*, Jun. 1994, 469-474.
H. Spies, H. Scharr, "Accurate Optical Flow in Noisy Image Sequences", *ICCV*, 1:587-592, Jul. 2001.
J. Sullivan, S. Carlsson, "Recognizing and Tracking Human Action" In *ECCV*, 2002.
Y. Yacoob, J. J. Black, "Parametrized Modeling and Recognition of Activities", *CVIU*, Feb. 1999, 73(2):232-247.
L. Zelnik-Manor, M. Irani, "Event-Based Analysis of Video", *CVPR*, 2001.
Y. Ukrainitz, M. Irani, "Aligning Sequences and Actions by Maximizing Space-Time Correlations", ECCV 2006.
Y. Boykov, O. Veksler, R. Zabih, "Fast Approximate Energy Minimization Via Graph Cuts", PAMI 2001.
A. Ng, M. Jordan, Y. Weiss, "On Spectral Clustering: Analysis and an Algorithm", NIPS 2001.

(Continued)

*Primary Examiner* — Samir Ahmed
*Assistant Examiner* — Ruiping Li
(74) *Attorney, Agent, or Firm* — Daniel J. Swirsky; AlphaPatent Associates Ltd.

(57) ABSTRACT

A method includes measuring the likelihood that two different space-time video segments could have resulted from a similar underlying motion field without computing the field. The method may be employed to identify locations in a video sequence where at least one behavioral phenomenon similar to that demonstrated in the video segment occurs. For example, the phenomenon might be a dynamic behavior, an action, a rigid motion, and/or a non-rigid motion.

25 Claims, 10 Drawing Sheets

OTHER PUBLICATIONS

Sharon, A. Brandt, R. Basri, "Fast Multiscale Image Segmentation", CVPR 2000.

Comaniciu, P. Meer, "Mean Shift: A Robust Approach Towards Feature Space Analysis", PAMI, May 2002, vol. 24(5):603-619.

* cited by examiner

TEMPLATE CORRELATION IN IMAGES

TEMPLATE:

INPUT IMAGE:

CORRELATION SURFACE:

SPACE-TIME BEHAVIOR BASED CORRELATION

FIELD OF THE INVENTION

The present invention relates to action recognition in video sequences.

BACKGROUND OF THE INVENTION

Different people with similar behaviors induce completely different space-time intensity patterns in a recorded video sequence. This is because they wear different clothes and their surrounding backgrounds are different. What is common across such sequences of same behaviors is the underlying induced motion fields. Efros et. al (in A. A. Efros, A. C. Berg, G. Mori and J. Malik. Recognizing action at a distance. ICCV, October 2003) employed this observation by using low-pass filtered optical-flow fields (between pairs of frames) for action recognition.

However, dense unconstrained and non-rigid motion estimation is highly noisy and unreliable. Clothes worn by different people performing the same action often have very different spatial properties (different color, texture, etc.) Uniform-colored clothes induce local aperture effects, especially when the observed acting person is large (which is why Efros et. al analyzed small people, "at a glance"). Dense flow estimation is even more unreliable when the dynamic event contains unstructured objects, like running water, flickering fire, etc.

Prior art methods for action-recognition in video sequences are limited in a variety of ways. The methods proposed by Bobick et. al (A. Bobick and J. Davis. The recognition of human movement using temporal templates. PAMI, 23(3):257-267, 2001) and Sullivan et. al (J. Sullivan and S. Carlsson. Recognizing and tracking human action. In ECCV, 2002) require prior foreground/background segmentation. The methods proposed by Yacoob et. al (Y. Yacoob and J. J. Black. Parametrized modeling and recognition of activities. CVIU, 73(2):232-247, 1999), Black (M. J. Black. Explaining optical flow events with parameterized spatiotemporal models, in CVPR, 1999), Bregler (C. Bregler. Learning and recognizing human dynamics in video sequences. CVPR, June 1997), Chomat et. al (O. Chomat and J. L. Crowley. Probabilistic sensor for the perception of activities. ECCV, 2000), and Bobick et. al require prior modeling or learning of activities, and are therefore restricted to a small set of predefined activities. The methods proposed by Efros et. al, Yacoob et. al, and Black require explicit motion estimation or tracking, which entail the fundamental hurdles of optical flow estimation (aperture problems, singularities, etc.)

SUMMARY OF THE INVENTION

It is an object of the present invention to provide a novel method for handling behavioral phenomena in a video sequence.

There is therefore provided, in accordance with a preferred embodiment of the present invention, a method including measuring the likelihood that two different space-time video segments could have resulted from a similar underlying motion field without computing the field.

Moreover, in accordance with a preferred embodiment of the present invention, the measuring utilizes pixel values directly. The pixel values are at least one of the following: pixel intensities, pixel colors, filtered intensities, local SSD (sum of square differences) surfaces, correlation surfaces and normalized correlation surfaces.

Further, in accordance with a preferred embodiment of the present invention, the measuring includes determining local motion consistency between corresponding, relatively small, space-time patches of the video segments. The corresponding space-time patches may be locally shifted relative to each other.

Still further, in accordance with a preferred embodiment of the present invention, the measuring includes comparing the space-time patches to a set of representative patches to generate feature vectors and determining motion consistency as a function of the distance between the feature vectors of the corresponding space-time patches.

In accordance with an alternative preferred embodiment of the present invention, the measuring includes comparing the space-time patches to a set of representative patches to generate feature vectors and determining motion consistency as a function of the distance between distributions of the feature vectors extracted from space-time corresponding regions within the video segments.

Moreover, in accordance with a preferred embodiment of the present invention, the determining includes calculating whether a vector u with a non-zero temporal component exists which is perpendicular to space-time gradients of pixel values in the corresponding space-time patches.

Additionally, in accordance with a preferred embodiment of the present invention, the determining includes calculating a rank increase between a 2×2 upper-left minor matrix of a 3×3 gram matrix of the space-time gradients and the 3×3 gram matrix. The rank increase measure may be a continuous rank increase measure and/or it may be approximate.

Further, in accordance with a preferred embodiment of the present invention, the method may include computing local consistency scores as a function of the local motion consistency for a multiplicity of the space-time patches within the video segments, aggregating the local consistency scores into a global correlation score between the video segment and the video sequence, determining a correlation volume of the video sequence with respect to the video segment and identifying peaks in the correlation volume, the peaks denoting locations in the video sequence where behavioral phenomena occur.

Still further, in accordance with a preferred embodiment of the present invention, the determining includes generating multiple resolutions of the video sequence and the video segment, wherein multiple resolutions are in at least one of space and time, searching a coarse resolution of the video segment within a coarse resolution of the video sequence to find locations with high match values, refining the search in a finer resolution around areas in the finer resolution corresponding to the locations in the coarse resolution and repeating the refined search until reaching a desired resolution level.

Additionally, in accordance with a preferred embodiment of the present invention, the measuring is employed for identifying locations in a video sequence where at least one behavioral phenomenon similar to that demonstrated in a video segment occurs. The at least one phenomenon may be a dynamic behavior, an action, a rigid motion, and/or a non-rigid motion. It may be a multiplicity of phenomena occurring within a field-of-view of a camera.

Moreover, in accordance with a preferred embodiment of the present invention, an entity performing the at least one phenomenon in the video segment does not have the same appearance as an entity performing a phenomenon similar to the at least one phenomenon in the video sequence. The entity may be a person, an animal a rigid object, and/or a non-rigid object.

Further, in accordance with a preferred embodiment of the present invention, the measuring is employed for at least one of the following: video search, indexing and fast forward to a next phenomenon of the behavioral phenomenon.

Alternatively, in accordance with a preferred embodiment of the present invention, the measuring is employed for automatic video sequence registration or alignment, or for action based identification of an entity.

In accordance with a preferred embodiment of the present invention, the identifying is employed for spatio-temporal clustering or for video segmentation into sequences of similar phenomena.

There is also provided, in accordance with a preferred embodiment of the present invention, a method including constructing a correlation volume between a video segment and a video sequence.

There is also provided, in accordance with a preferred embodiment of the present invention, a method including measuring a rank-increase between a 2×2 upper-left minor matrix of a 3×3 gram matrix and the 3×3 gram matrix as a function of the discrepancy between the eigenvalues of the gram matrix and the minor matrix.

Moreover, in accordance with a preferred embodiment of the present invention, the function includes the ratio between the product of the three eigenvalues of the gram matrix and the two eigenvalues of the minor matrix.

Further, in accordance with a preferred embodiment of the present invention, the function includes the difference between the sum of the three eigenvalues of the gram matrix and the two eigenvalues of the minor matrix.

Still further, in accordance with a preferred embodiment of the present invention, the function includes calculating the following:

$$\Delta r = \frac{\lambda_2 \cdot \lambda_3}{\lambda_1^\diamond \cdot \lambda_2^\diamond}$$

where the eigenvalues of the gram matrix are $\lambda_1 \geq \lambda_2 \geq \lambda_3$, and the eigenvalues of the minor matrix are $\lambda_1^\diamond \geq \lambda_2^\diamond$.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
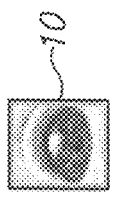
FIG. 1 is an illustrative example of two-dimensional image correlation.
Figure 1:
Figure 1:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that the constraints to action recognition in video presented by the methods of the prior art may be circumvented by a novel approach to action recognition in video.

Applicants have realized that 2-dimensional image correlation, which is well known in the art, may be extended into a 3-dimensional space-time video-template correlation. Applicants have further realized that the novel 3-dimensional space-time video-template correlation may be employed to recognize similar actions in video segments.

In 2-dimensional image correlation, a template of the desired image (the correlation kernel) is compared with the actual camera image of an object and a new image (the correlation image) is generated. The peak correlation values in the correlation image indicate where the template matches the camera image.

Reference is now made to FIG. 1 which shows an example of template correlation. In the example shown in FIG. 1, a template 10 of the desired image is an eye of a monkey shown in a camera image 15. A comparison of template 10 with camera image 15 generates the correlation image 20 (overlaid on top of the camera image), which indicates where the template matches the camera image. As shown in FIG. 1, the particularly bright patches in correlation image 20 indicate the positions of the eyes of the monkey, where camera image 15 matches template 10.

When image correlation is conducted in three dimensions in accordance with a preferred embodiment of the present invention, templates comprising small space-time video segments (small video clips) may be "correlated" against entire video sequences in all three dimensions (x, y, and t). Peak correlation values may correspond to segments of the video sequences in which dynamic behaviors similar to those in the template occur.

Applicants have realized that action recognition via 3-dimensional space-time video template correlation may detect very complex behaviors in video sequences (e.g., ballet movements, pool dives, running water), even when multiple complex activities occur simultaneously within the field-of-view of the camera.

Applicants have further realized that the similarity between two different space-time intensity patterns of two different video segments may be measured directly from the intensity information, without explicitly computing the underlying motions. This type of measurement may allow for the detection of similarity between video segments of differently dressed people performing the same type of activity, without requiring foreground/background segmentation, prior learning of activities, motion estimation or tracking.

The present invention may identify locations in a video sequence where a motion demonstrated in a video segment occurs. The present invention may also be a behavior-based similarity measure which may indicate the likelihood that two different space-time intensity patterns of two different video segments result from a similar underlying motion field, without explicitly computing that motion field.

Figure 2:
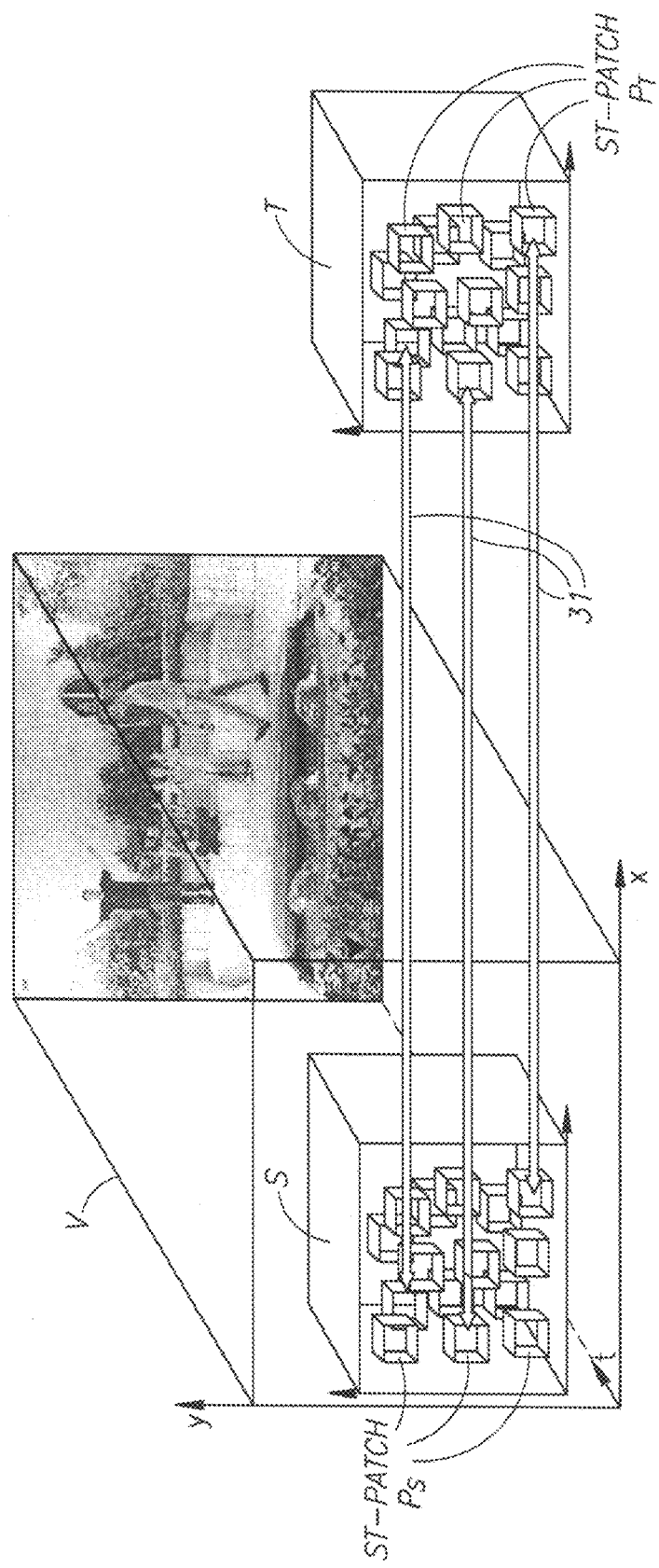
FIG. 2 is a schematic illustration of three-dimensional image correlation of an exemplary video template against an exemplary video sequence in accordance with a preferred embodiment of the present invention.

Reference is now made to FIG. 2 which shows the video components which, in accordance with a preferred embodiment of the present invention, may be considered in order to correlate templates of small space-time video segments (small video clips) against entire video sequences in all three dimensions (x, y, and t). As shown in FIG. 2, T may be a small space-time template which is correlated against a larger video sequence V. T may be a very small video clip, e.g., 30×30 pixels by 30 frames, while V may be a video of a standard format size (e.g. in PAL—720×576 and in NTSC—640×480) and of a standard video length (e.g. several minutes or hours). It will be appreciated that the sizes here are exemplary only and that the present invention is operable for many different sized small video clips T and videos V.

The correlation of T against V may generate a space-time "behavioral correlation volume" C(x, y, t), which may be analogous to the 2-dimensional correlation surface 20 introduced in FIG. 1. Peaks within correlation volume C may be occurrences of behavior in video sequence V similar to the behavior in template T.

In accordance with a preferred embodiment of the present invention, each value in correlation volume C may be computed by measuring the degree of behavioral similarity between two video segments: the space-time template T, and a video segment $S \subset V$, where S (FIG. 2) may be of the same dimensions as T and may be centered around the point (x, y, t)∈V. The behavioral similarity between video segments T and S may be evaluated by computing and integrating local consistency measures between small space-time patches P within these video segments. Each space-time patch (ST-patch) P may be 7×7 pixels by 3 frames, or any other small volume. As shown in FIG. 2, for each point (x, y, t)∈S, an ST-patch $P_S \subset S$ centered around (x, y, t) may be compared, in a suitable manner, against its corresponding ST-patch $P_T \subset T$ at the matching location. Lines 31 indicate exemplary corresponding ST-patches $P_T$ and $P_S$ in T and S respectively.

These local scores may then be aggregated to provide a global correlation score for the entire template T at this video location, in a similar manner to the way correlation of image templates may be performed. However, here the small patches P also have a temporal dimension, and thus the similarity measure between patches may capture similarity of the implicit underlying motions.

Figure 3:
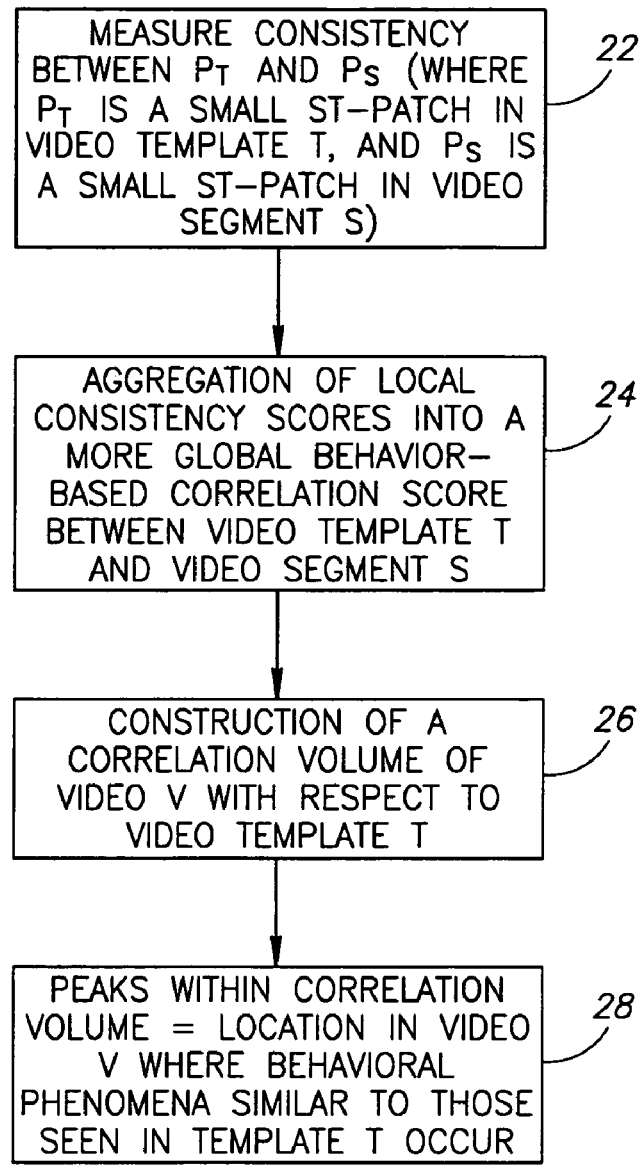
FIG. 3 is a flow chart illustration of a method of identifying locations in a video sequence where a motion demonstrated in a video segment occurs, constructed and operative in accordance with the present invention.

Reference is now made to FIG. 3, which is a flow chart illustration summarizing the method steps developed by Applicants and described hereinabove, which method may be tangibly embodied in a program of instructions executable by a machine. As shown in FIG. 3, the method begins by measuring (step 22) the consistency between ST-patches $P_T$ and $P_S$, after which, the method may aggregate (step 24) the local consistency scores into a more global behavior-based correlation score between video template T and video segment S. The method may continue by constructing (step 26) some type of correlation volume C of video V with respect to video template T. Finally, the method may identify (step 28) the peaks in correlation volume C as locations in video V where behavioral phenomena similar to those seen in template T occur.

When measuring (step 22) the consistency, each ST-patch $P_S$ may be compared to the associated patch $P_T$ or to a small neighborhood around the matching location in video template T (one patch against many). The latter embodiment may account for non-rigid deformations of the behavior. When comparing one patch to multiple patches, the method may select the best match among all the matches or a weighted average of them Another possibility is to compare a small neighborhood in S to the matching, small, neighborhood in T (several patches against several patches). The comparison in this case may be of the local statistics of the behaviors and, as is discussed in detail hereinbelow, may involve comparing histograms or distributions of feature vectors extracted using the similarity measure.

Figure 4:
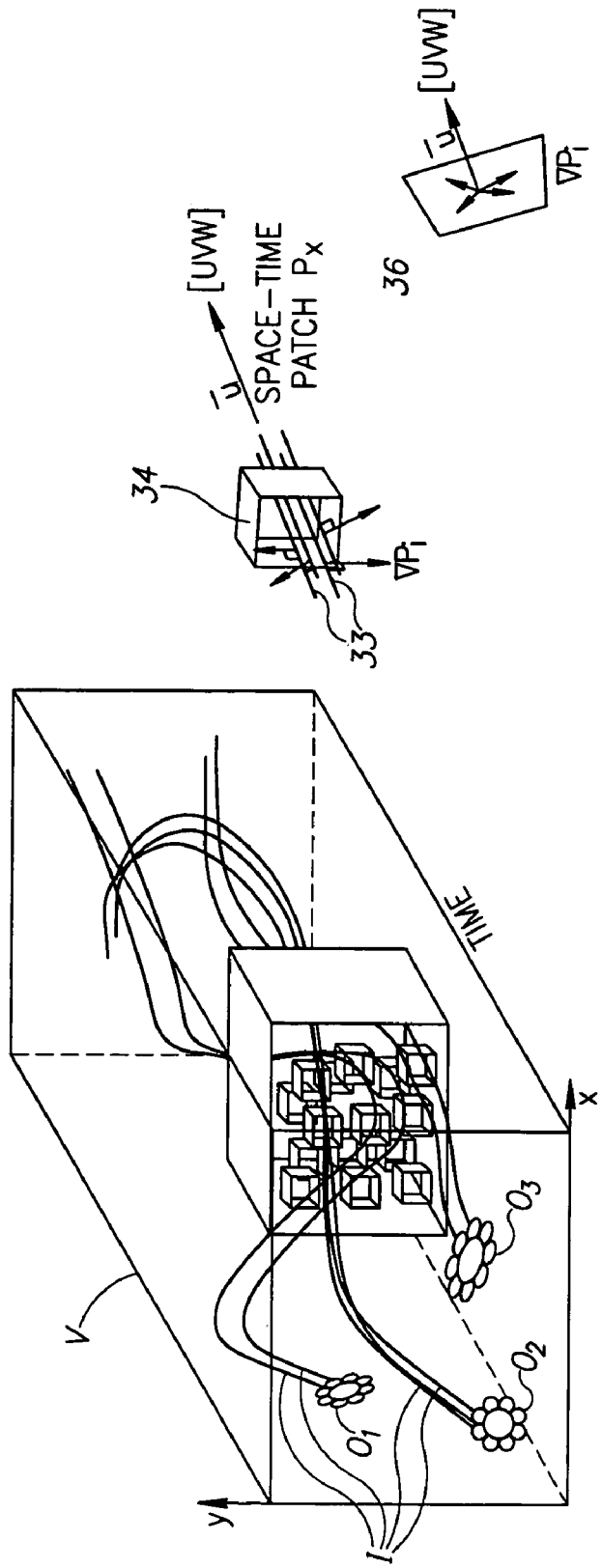
FIG. 4 is a schematic illustration showing how consistency between the space-time (ST)-patches of FIG. 2 may be measured, in accordance with a preferred embodiment of the present invention.

FIG. 4, reference to which is now made, shows how consistency between ST-patches $P_T$ and $P_S$ may be measured (step 22) in accordance with a preferred embodiment of the present invention. In FIG. 4, objects $O_1$, $O_2$ and $O_3$ are shown to move through space over time in video V. Each object O induces a "brush" of intensity curves I in the space-time volume. Applicants have realized that curves I may be complex, but that locally (within a small space-time patch), curves I may be assumed to be straight lines 33 as shown in detail 34 of space-time patch $P_x$.

Applicants have realized that this assumption may be true for most ST-patches in real video sequences. A very small number of patches in the video sequence may violate this assumption. The latter may be patches located at motion discontinuities, as well as patches that contain an abrupt temporal change in the motion direction or velocity.

For most patches, the intensity lines 33 within a single ST-patch may thus be oriented in a single space-time direction $\bar{u}=[u, v, w]$ as shown in detail 34. The direction $\bar{u}$ may be different for different points (x,y,t) in the video sequence. It may be assumed to be uniform only locally, within a small ST-patch P centered around each point in the video.

Space-time gradients $\nabla P_i = (P_{x_i}, P_{y_i}, P_{t_i})$ of the intensity at each pixel within the ST-patch $P_i$ (i=1 . . . n) may all be pointing to directions of maximum change of intensity in space-time, as shown in detail 34. Namely, these gradients may all be perpendicular to the direction $\bar{u}$ of intensity lines 33, which may be expressed as the following linear equation:

$$\nabla P_i \begin{bmatrix} u \\ v \\ w \end{bmatrix} = 0$$

Different space-time gradients of different pixels in P (e.g., $\nabla P_i$ and $\nabla P_j$) may not necessarily be parallel to each other, but they may all reside in a single 2-dimensional plane in the space-time volume, such as 2-dimensional plane 36 shown in FIG. 4, which is perpendicular to direction $\bar{u}$.

Figure 5A:
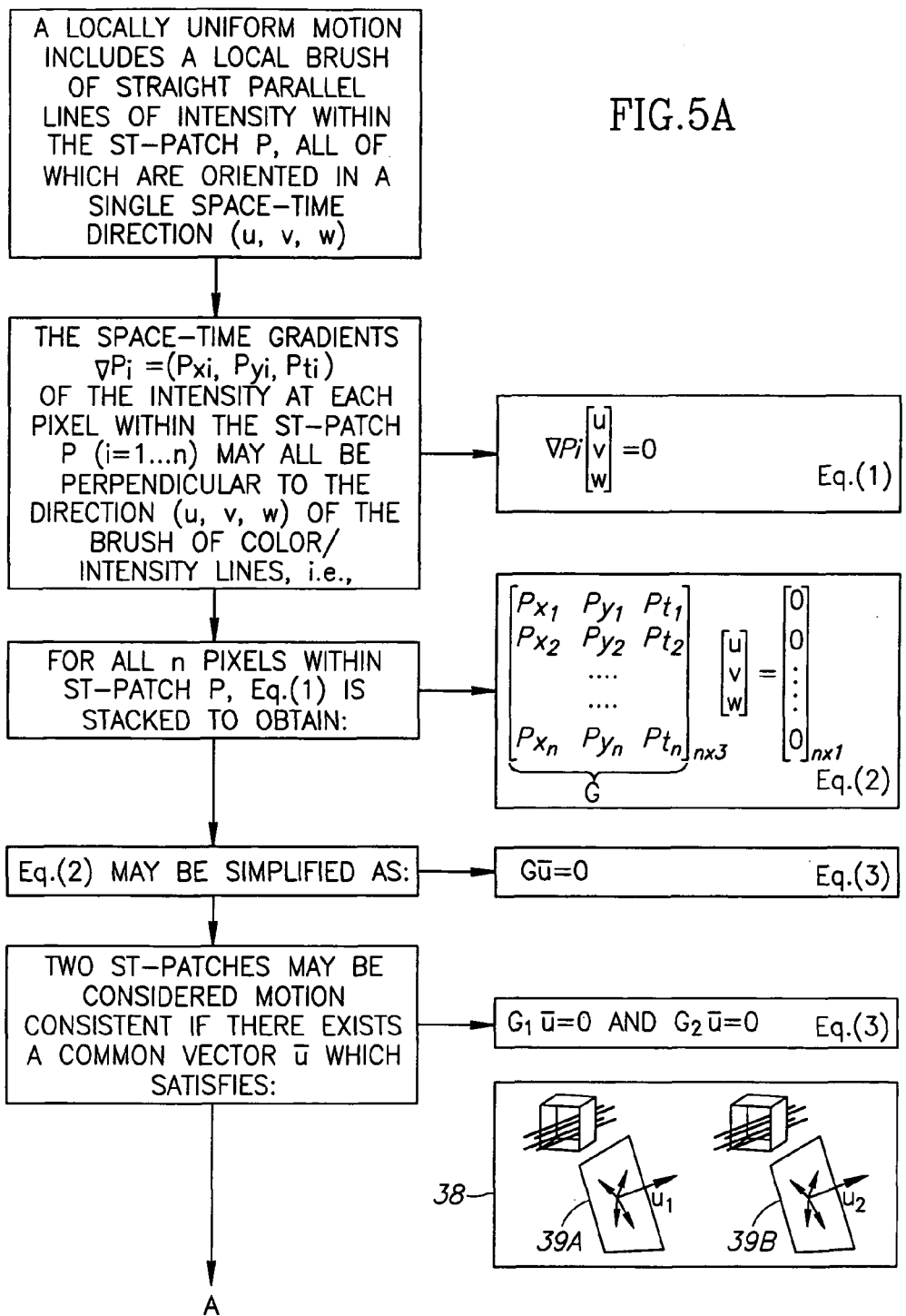
FIGS. 5A, 5B and 5C are flow chart illustrations of the derivation of the calculation used for measuring consistency in the method of FIG. 3.
Figure 5B:
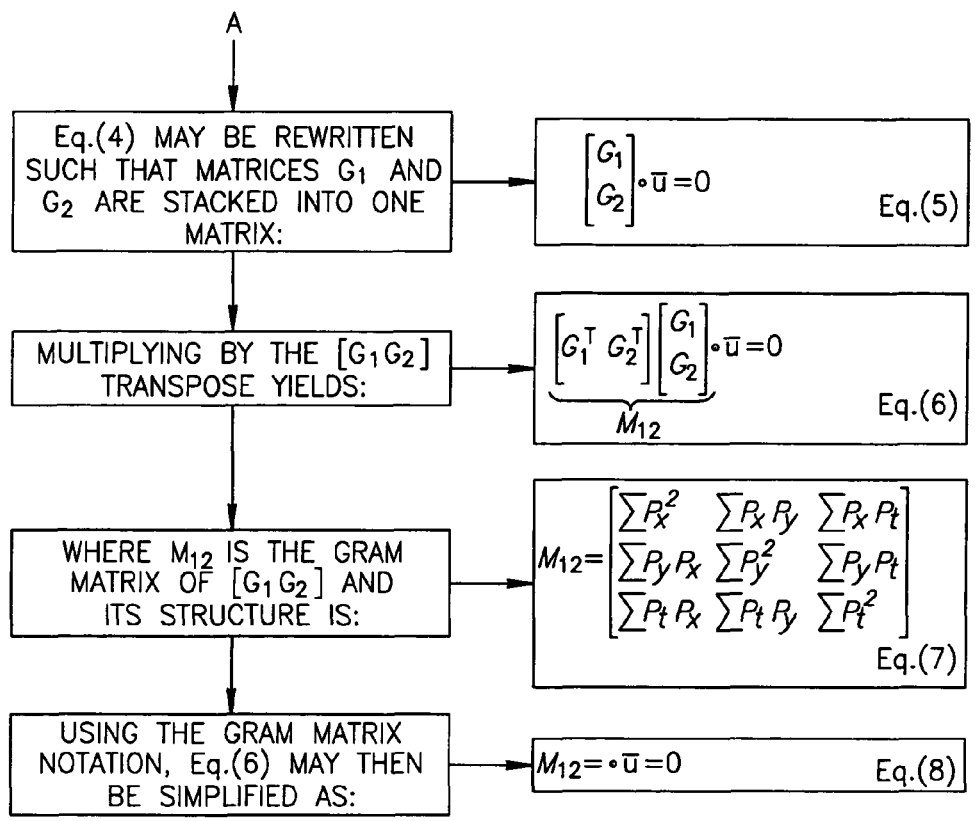
Figure 5C:
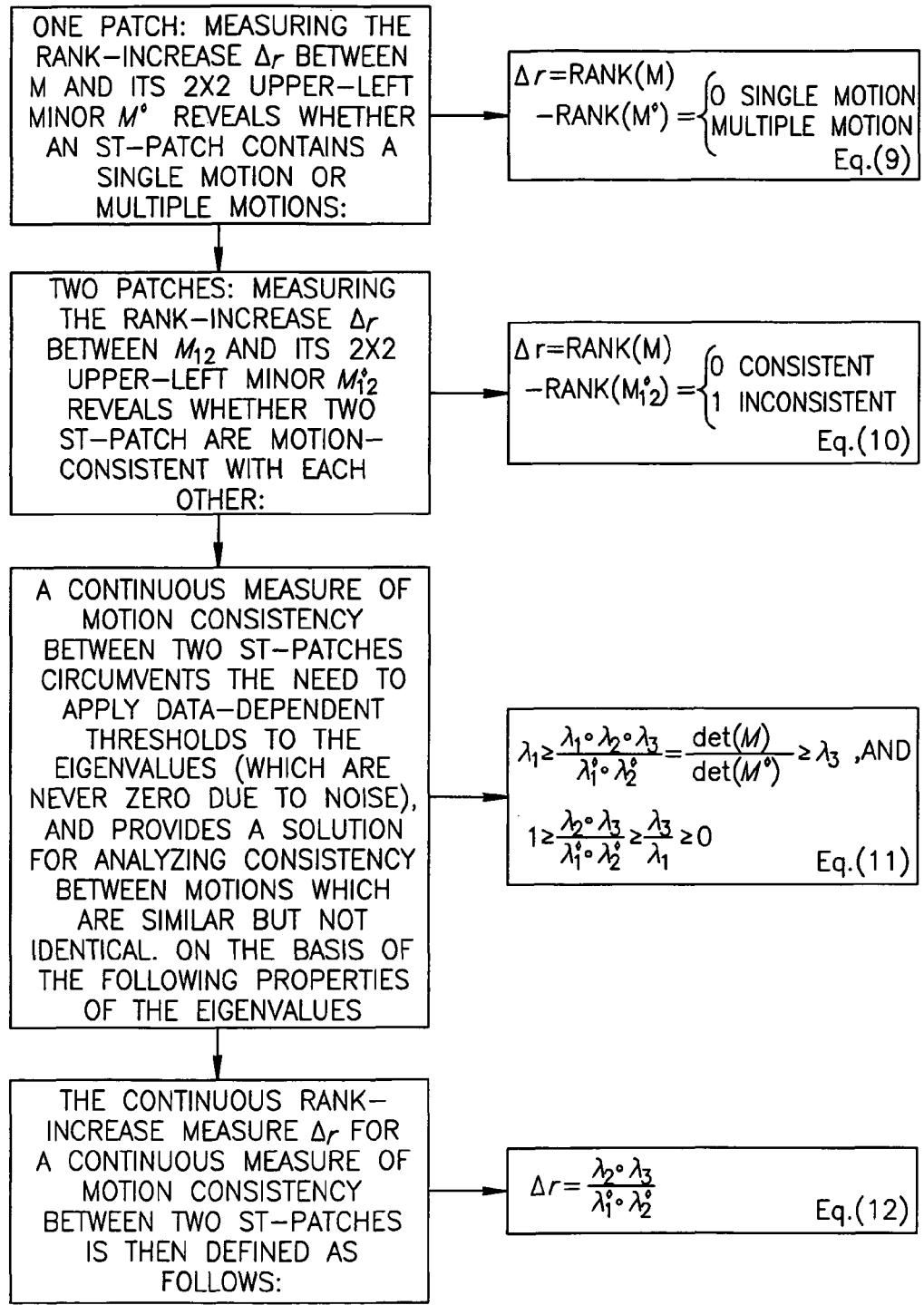

From the equation describing the perpendicularity of the gradients $\nabla P_i = (P_{x_i}, P_{y_i}, P_{t_i})$ to the direction $\bar{u}$ of the brush of intensity lines 33, Applicants have derived, as illustrated in FIGS. 5A, 5B and 5C, reference to which is now made, a mathematical method to measure consistency between ST-patches $P_T$ and $P_S$ (step 22). As shown in FIG. 5A, Eq. 1 refers to the equation describing the perpendicularity of the gradients $\nabla P_i = (P_{x_i}, P_{y_i}, P_{t_i})$ to the direction $G\bar{u}=0$ of intensity lines 33.

Because there are many different gradients $\nabla P_i$, but such that the direction $\bar{u}$ is perpendicular to all of them, the next equation, Eq. 2, may be obtained by stacking the equations from all n pixels within the small ST-patch P, yielding:

$$\underbrace{\begin{bmatrix} P_{x_1} & P_{y_1} & P_{t_1} \\ P_{x_2} & P_{y_2} & P_{t_2} \\ \ldots & & \\ \ldots & & \\ P_{x_n} & P_{y_n} & P_{t_n} \end{bmatrix}_{n\times 3}}_{G} \begin{bmatrix} u \\ v \\ w \end{bmatrix} = \begin{bmatrix} 0 \\ 0 \\ \vdots \\ 0 \end{bmatrix}_{n\times 1}$$

where n is the number of pixels in P (e.g., if P is 7×7×3, then n=147). In other words, gradients $\nabla P_i$ are embedded in a 2-dimensional plane, where direction $\bar{u}$ is perpendicular to that plane. When G is used to denote the matrix of gradients $\nabla P_i$, and $\bar{u}$ is used to denote the direction, Eq. 2 may be simplified as:

$$G\bar{u}=0$$

This simplified equation is referred to as Eq. 3 in FIG. 5A.

Applicants have realized that two ST-patches $P_1$ and $P_2$ may be considered motion consistent if there exists a common vector $\bar{u}=[u,v,w]$ which satisfies the equations:

$$G_1\bar{u}=0 \text{ and } G_2\bar{u}=0$$

which is referred to as Eq. 4 in FIG. 5A. Diagram 38 in FIG. 5A illustrates how the fulfillment of this condition indicates motion consistent patches. Two two-dimensional planes 39A and 39B, which are defined by the gradients $\nabla P_i$ of the local intensity lines in ST-patches $P_1$ and P2, are shown, as are their associated vectors $\bar{u}_1$ and $\bar{u}_2$. If vectors $\bar{u}_1$ and $\bar{u}_2$ are the same, then there is consistency between those local intensity lines; that is, the motions which induced those intensity lines are consistent.

It will be appreciated that, in the prior art, it was necessary to solve the equations in Eq. 4 in order to compute the optical flow in ST-patches $P_1$ and $P_2$. However, it is known in the art that these equations may not be well-defined and that their solution is difficult. Applicants have realized that it is sufficient to determine whether a solution $\bar{u}$ exists and, if it does, then the two patches may be considered motion consistent.

As shown in Eq. 5 in FIG. 5B, Eq. 4 may be rewritten such that matrices $G_1$ and $G_2$ are stacked into one matrix, yielding:

$$\begin{bmatrix} G_1 \\ G_2 \end{bmatrix} \cdot \bar{u} = 0$$

The meaning of this equation is that the vector $\bar{u}$ should be perpendicular to both planes spanned by the gradients of the two patches.

The next equation, as shown in Eq. 6 in FIG. 5B, is derived from Eq. 5 by multiplying it by the $[G_1\ G_2]$ transpose. The left matrix is then denoted $M_{12}$.

$$\underbrace{[G_1^T\ G_2^T]\begin{bmatrix} G_1 \\ G_2 \end{bmatrix}}_{M_{12}} \cdot \bar{u} = 0$$

where $M_{12}$ is the "gram matrix" of $[G_1\ G_2]$. This matrix is symmetric and positive-definite, and has the following structure:

$$M_{12} = \begin{bmatrix} \sum P_x^2 & \sum P_x P_y & \sum P_x P_t \\ \sum P_y P_x & \sum P_y^2 & \sum P_y P_t \\ \sum P_t P_x & \sum P_t P_y & \sum P_t^2 \end{bmatrix}$$

The gram matrix $M_{12}$ is shown as Eq. 7 in FIG. 5B. Eq. 8 in FIG. 5A shows the following equation, which is Eq. 6 simplified as:

$$M_{12}\cdot\bar{u}=0$$

Applicants have realized that the rank of matrix $M_{12}$ may be used to indicate whether the two patches $P_1$ and $P_2$ are motion consistent, as follows: if the two individual matrices $M_1$ and $M_2$ are of rank 2, then their space-time gradients span two-dimensional planes, such as the planes 39A and 39B, respectively. For each plane 39, there exists a normal vector $\bar{u}$ that is perpendicular to all of the space-time gradients in its associated patch P. If patches $P_1$ and $P_2$ are motion consistent, then the two associated planes 39A and 39B, respectively, are coplanar (and coincide) and the rank of the joint matrix $M_{12}$ is 2. If, however, the rank of matrix $M_{12}$ is 3, then the planes are not coplanar and patches $P_1$ and $P_2$ are not motion consistent.

Mathematically defined, when there exists at least one vector $\bar{u}$ that is normal to all gradients in the two patches, that is, when the two patches are motion consistent, then $M_{12}$ is a 3×3 rank deficient matrix: $\text{rank}(M_{12})\leq 2$.

Applicants have also realized that if $M_{12}$ is not rank-deficient, (i.e., $\text{rank}(M_{12})=3 <=> \lambda_{min}(M_{12})\neq 0$), then the two patches cannot be motion consistent.

It will be appreciated that the rank-based constraint method described hereinabove to determine whether two ST-patches are motion consistent is based only on the intensities of the two patches, and avoids explicit motion estimation, which is often very difficult in complex dynamic scenes. Moreover, the two ST-patches need not be of the same size in order to measure their motion consistency.

Applicants have further realized that the rank-3 constraint on $M_{12}$ is a sufficient but not a necessary condition. Namely, if $\text{rank}(M_{12})=3$, then there is no single image motion which can induce the intensity pattern of both ST-patches $P_1$ and $P_2$, and therefore they are not motion-consistent. However, there may be cases in which there is no single motion which can induce the two space-time intensity patterns $P_1$ and $P_2$, yet $\text{rank}(M_{12})<3$. This can happen, for example, when each of the two space-time patches contains only a degenerate image structure (e.g., an image edge) moving in a uniform motion. In this case, the space-time gradients of each ST-patch will reside on a line in the space-time volume, all possible vectors $\bar{u}$ will span a 2D plane in the space-time volume, and therefore $\text{rank}(M_1)=1$ and $\text{rank}(M_2)=1$. Since $M_{12}=M_1+M_2$, therefore $\text{rank}(M_{12})\leq 2<3$, regardless of whether there is or isn't motion consistency between $P_1$ and $P_2$.

Applicants have realized that the only case in which the rank-3 constraint on $M_{12}$ is both sufficient and necessary for detecting motion inconsistencies, is when both matrices $M_1$ and $M_2$ are each of a rank smaller than 3 (assuming each ST-patch contains a single motion).

Applicants have therefore generalized the notion of the rank constraint on $M_{12}$ to obtain a sufficient and necessary motion-consistency constraint for both degenerate and non-degenerate ST-patches.

Applicants have realized that all possible ranks of the matrix M of an individual ST-patch P which contains a single uniform motion are as follows: rank(M)=2 when P contains a corner-like image feature, rank(M)=1 when P contains an edge-like image feature, rank(M)=0 when P contains a uniform colored image region.

This information regarding the spatial properties of P is captured in the 2×2 upper-left minor $M^\diamond$ of the matrix M (Eq. 7, FIG. 5B):

$$M^\diamond = \begin{bmatrix} \sum P_x^2 & \sum P_x P_y \\ \sum P_y P_x & \sum P_y^2 \end{bmatrix}$$

This is very similar to the matrix used by Harris et. al (C. Harris and M. Stephens. A combined corner and edge detector. In 4th *Alvey Vision Conference*, pages 147-151, 1988), but the summation here is over a 3-dimensional space-time patch, and not a 2-dimensional image patch.

In other words, for an ST-patch with a single uniform motion, the following rank condition holds: rank(M)=rank($M^\diamond$). Namely, when there is a single uniform motion within the ST-patch, the added temporal component (which is captured by the third row and third column of M) does not introduce any increase in rank.

However, when an ST-patch contains more than one motion, i.e., when the motion is not along a single straight line, the added temporal component may introduce an increase in the rank, namely: rank(M)=rank($M^\diamond$)+1. It will be appreciated that the difference in rank cannot be more than 1, because only one column/row is added in the transition from $M^\diamond$ to M.

Applicants have accordingly derived Eq. 9, as shown in FIG. 5C, as follows, in which the rank-increase $\Delta r$ between M and its 2×2 upper-left minor $M^\diamond$ is measured, for determining whether one ST-Patch contains a single motion or multiple motions:

$$\Delta r = \text{rank}(M) - \text{rank}(M^\diamond) = \begin{cases} 0 & \text{single motion} \\ 1 & \text{multiple motions} \end{cases}$$

It will be appreciated that this is a generalization of the rank-3 constraint on M described hereinabove. (When the rank M is 3, then the rank of its 2×2 minor is 2, in which case the rank-increase is 1). This generalized constraint is valid for both degenerate and non-degenerate ST-patches.

Following the same reasoning for two different ST-patches, Applicants have derived a sufficient and necessary condition for detecting motion inconsistency between two ST-patches, as shown in FIG. 5C (Eq. 10) and as follows:

$$\Delta r = \text{rank}(M_{12}) - \text{rank}(M_{12}^\diamond) = \begin{cases} 0 & \text{consistent} \\ 1 & \text{inconsistent} \end{cases}$$

That is, for two ST-patches $P_1$ and $P_2$, the rank-increase $\Delta r$ between $M_{12}$ and its 2×2 upper-left minor $M_{12}^\diamond$ may be measured to determine whether the two ST-patches are motion-consistent with each other.

It will be appreciated that Eq. 10 is a-generalization of the rank-3 constraint on $M_{12}$ presented hereinabove with respect to Eq. 8. This generalized constraint is valid for both degenerate and non-degenerate ST-patches.

One approach to estimate the rank-increase from $M^\diamond$ to M is to compute their individual ranks, and then take the difference, which provides a binary value (0 or 1). The rank of a matrix is determined by the number of non-zero eigenvalues it has or, more practically, by the number of eigenvalues above some threshold.

However, due to noise, eigenvalues are never zero. Applying a threshold to the eigenvalues is usually data-dependent, and a wrong choice of a threshold would lead to wrong rank values. Moreover, the notion of motion consistency between two ST-patches (which is based on the rank-increase) is often not binary. That is, it is not straightforward whether two motions which are very similar but not identical are consistent or not. Applicants have therefore developed the notion of a continuous measure of motion consistency between two ST-patches.

The eigenvalues of the 3×3 matrix M may be denoted $\lambda_1 \geq \lambda_2 \geq \lambda_3$, and the eigenvalues of its 2×2 upper-left minor $M^\diamond$ may be denoted $\lambda_1^\diamond \geq \lambda_2^\diamond$. From the Interlacing Property of eigenvalues in symmetric matrices, as taught by Golub et. al. (G. Golub and C. V. Loan. *Matrix Computations*. The Johns Hopkins University Press, 1996, p. 396), it follows that:

$$\lambda_1 \geq \lambda_1^\diamond \geq \lambda_2 \geq \lambda_2^\diamond \geq \lambda_3,$$

leading to the following two observations, denoted Eq. 11 in FIG. 5C:

$$\lambda_1 \geq \frac{\lambda_1 \cdot \lambda_2 \cdot \lambda_3}{\lambda_1^\diamond \cdot \lambda_2^\diamond} = \frac{\det(M)}{\det(M^\diamond)} \geq \lambda_3, \text{ and}$$

$$1 \geq \frac{\lambda_2 \cdot \lambda_3}{\lambda_1^\diamond \cdot \lambda_2^\diamond} \geq \frac{\lambda_3}{\lambda_1} \geq 0.$$

The continuous rank-increase measure $\Delta r$ may then be defined as follows (Eq. 12):

$$\Delta r = \frac{\lambda_2 \cdot \lambda_3}{\lambda_1^\diamond \cdot \lambda_2^\diamond}$$

$0 \leq \Delta r \leq 1$. The case of $\Delta r=0$ is an ideal case of no rank increase, and when $\Delta r=1$ there is a clear rank increase. However, the above continuous definition of $\Delta r$ may allow analysis of noisy data (without taking any threshold), and may provide varying degrees of rank-increases for varying degrees of motion-consistencies.

A space-time video template T may consist of many small ST-patches. In accordance with a preferred embodiment of the present invention, it may be correlated against a larger video sequence by checking its consistency with every video segment centered around every space-time point (x,y,t) in the large video. Applicants have realized that a good match between the video template T and a video segment S may satisfy two conditions:

1: that as many corresponding ST-patches as possible between T and S be brought into "motion-consistent alignment"; and 2: that the alignment between motion discontinuities within the template T and motion discontinuities within the video segment S be maximized. Such discontinuities may also result from space-time corners and very fast motion.

Applicants have further realized that a good global template match should also minimize the number of local inconsistent matches between regular patches (patches not containing motion discontinuity), and should also minimize the number of matches between regular patches in one sequence with motion discontinuity patches in the other sequence.

Applicants have therefore developed the following measure to capture the degree of local inconsistency between a small ST-patch $P_1 \in T$ and a ST-patch $P_2 \in S$, in accordance with conditions 1 and 2.

$$m_{12} = \frac{\Delta r_{12}}{\min(\Delta r_1, \Delta r_2) + \varepsilon}$$

where $\varepsilon$ avoids division by 0. This measure may yield low values (i.e., 'consistency') when $P_1$ and $P_2$ are motion consistent with each other (in which case, $\Delta r_{12} \approx \Delta r_1 \approx \Delta r_2 \approx 0$). It may also provide low values when both $P_1$ and $P_2$ are patches located at motion discontinuities within their own sequences (in which case, $\Delta r_{12} \approx \Delta r_1 \approx \Delta r_2 \approx 1$). The variable $m_{12}$ may provide high values (i.e., 'inconsistency') in all other cases.

Thus, to measure consistency (step 22 of FIG. 3), the method of the present invention may determine the value of $m_{12}$ for every pair of ST-patches.

To obtain a global inconsistency measure between the template T and a video segment S (step 24), the average value of $m_{12}$ in T may be computed:

$$\frac{1}{N} \sum m_{12}(x, y, t),$$

where N is the number of space-time points (and therefore also the number of ST-patches) in T. Similarly, a global consistency measure between the template T and a video segment S may be computed as the average value of $$\frac{1}{m_{12}},$$

i.e.:

$$C(T, S) = \frac{1}{N} \sum \frac{1}{m_{12}(x, y, t)}.$$

The summation may be a regular one or a weighted summation:

$$C(T, S) = \frac{\sum \frac{1}{m_{12}(x, y, t)} * w(x, y, t)}{\sum w(x, y, t)}$$

where $w(x,y,t)$ may be a set of weights that may depend, for example, on the amount of space-time gradients in the patch and penalizes smooth patches that are, in principle, consistent with any other patch and therefore non-informative.

An alternative possibility may be to give more weight to the informative corner-like patches than to the less informative edge-like (degenerate) patches. In some applications, dynamic regions may be more important than static ones and therefore, larger weights may be assigned to patches with large temporal gradients of normal-flow values. If figure-background segmentation is desired, then a larger weight may possibly be given to foreground patches than to background ones. The weights may also be pre-defined by a user who may choose to give more weights to the more important regions in the template. In all cases, the weights may have continuous values or they may be a binary mask ("soft" vs. "hard" weighting).

A space-time template T (e.g., of size 30×30 pixels×30 frames) may thus be correlated (step 26) against a larger video sequence S by sliding the template T around sequence S in all three dimensions (x, y and t), while computing its consistency with video segment S at every video location. (To allow flexibility for small changes in scale and orientation, template T and video sequence S may be correlated at a portion, such as halls of their original resolution). A space-time correlation volume may thus be generated. Peaks within this correlation volume may be identified (step 28) as locations in the large video sequence where behavior similar to that demonstrated in the template may be detected. Examples of such correlation peaks can be found in FIGS. 6, 7, and 8, reference to which is now made.

Figure 6:
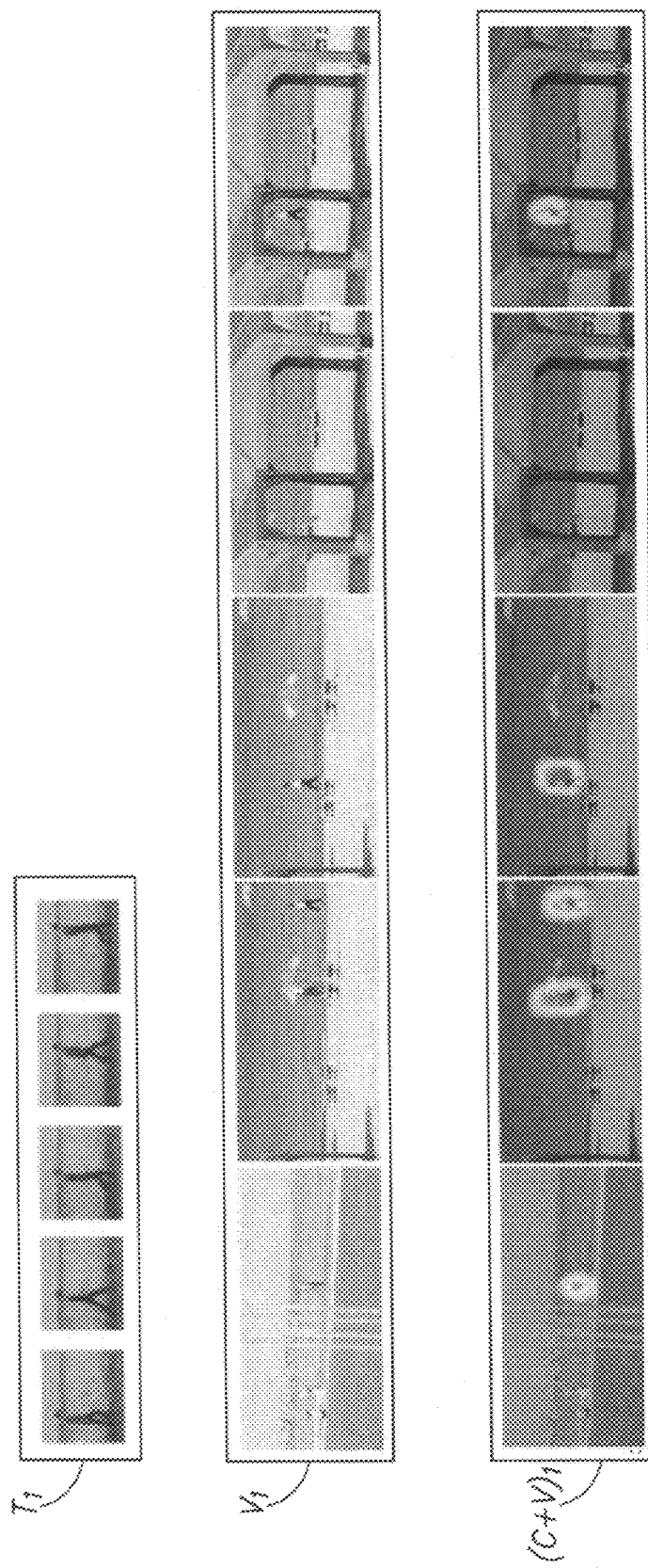
FIG. 6 is an illustration of the employment of the present invention to detect instances of people walking in a video recorded on a beach.

FIG. 6 shows the results of employing the method of the present invention to detect instances of people walking in a video recorded on a beach. The space-time template $T_1$ was a very short video clip (14 frames of 60×70 pixels) of a man walking. A series of a few sample frames of template $T_1$ is shown in FIG. 6. Template $T_1$ was then correlated against a long (460 frames of 180×360 pixels) video $V_1$ recorded on a beach, in order to detect instances of people walking in video $V_1$. A series of a few sample frames from video $V_1$ is shown in FIG. 6. In order to detect instances of people walking in both directions in video $V_1$, Template $T_1$ was correlated twice with $V_1$. That is, both $T_1$ and the mirror image of $T_1$ were correlated with $V_1$.

Finally, the results of the correlation may be seen in FIG. 6. The series of frames denoted by reference numeral $(C+V)_1$ shows the peaks of the resulting space-time correlation volume $C_1(x,y,t)$ superimposed on $V_1$. All walking people, despite being of different shapes and sizes, dressed differently, and walking against a different background than the walking person in template $T_1$, were detected, as indicated by the bright patches highlighting the walking figures in frame series $(C+V)_1$ in FIG. 6.

Figure 7:
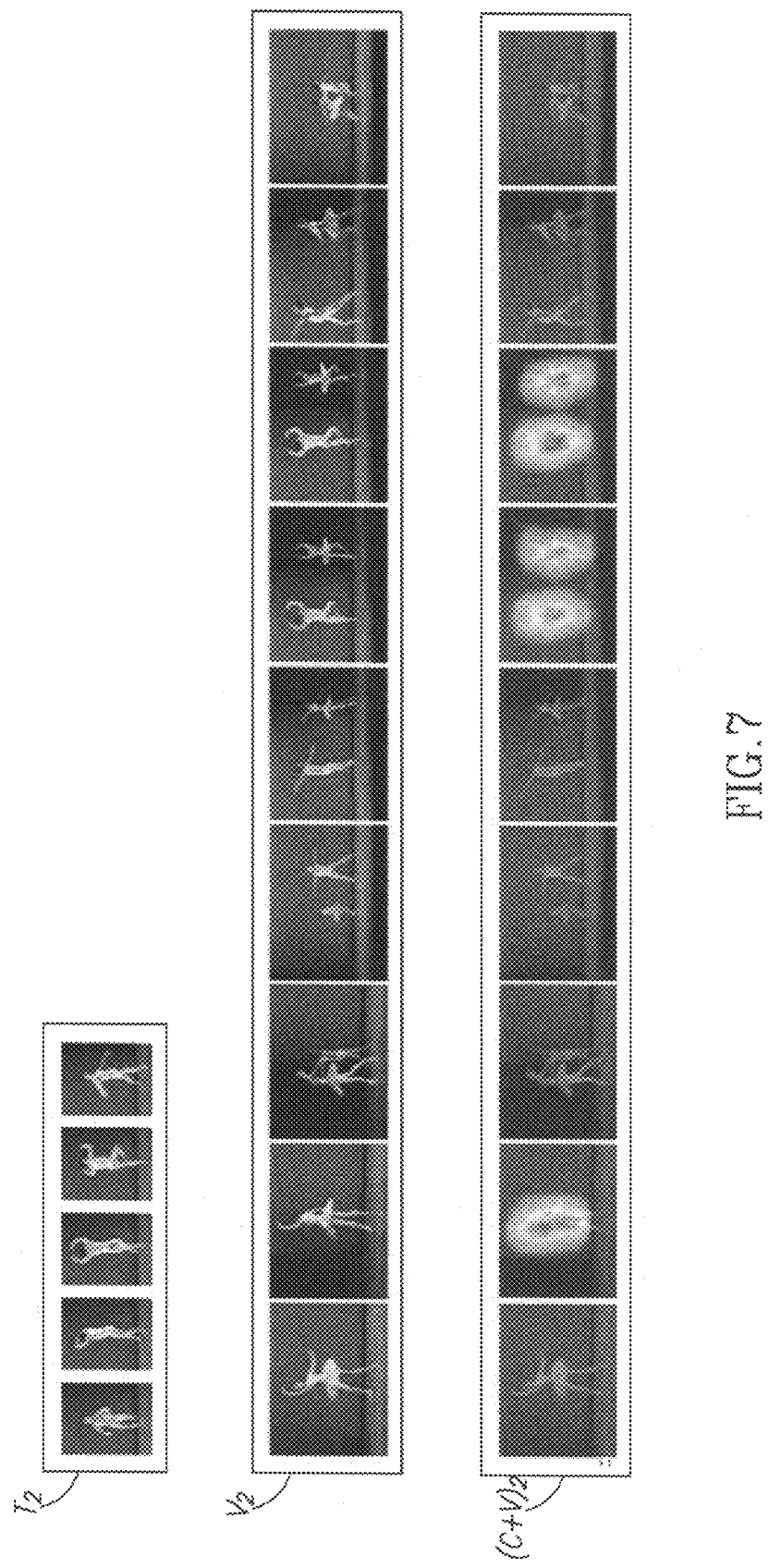
FIG. 7 is an illustration of the employment of the present invention to detect instances of a dancer performing a particular turn in a video of a ballet.

FIG. 7 shows an analysis of video footage of a ballet. In this example, the space-time template $T_2$ contains a single turn of a male dancer (13 frames of 90×110 pixels). A series of a few sample frames of template $T_2$ is shown in FIG. 7. A series of a few sample frames of the longer (284 frames of 144×192 pixels) ballet clip $V_2$ against which template $T_2$ was then correlated is also shown in FIG. 7.

The series of frames denoted by reference numeral $(C+V)_2$ shows the peaks of the resulting space-time correlation volume $C_2(x,y,t)$ superimposed on $V_2$. Most of the turns of the two dancers in $V_2$ (one male and one female) were detected, as indicated by the bright patches highlighting the turning figures in frame series $(C+V)_2$, despite the variability in scale relative to the male dancer in template $T_2$ (up to 20%). It will also be appreciated that this example contains very fast moving parts (frame-to-frame).

Figure 8:
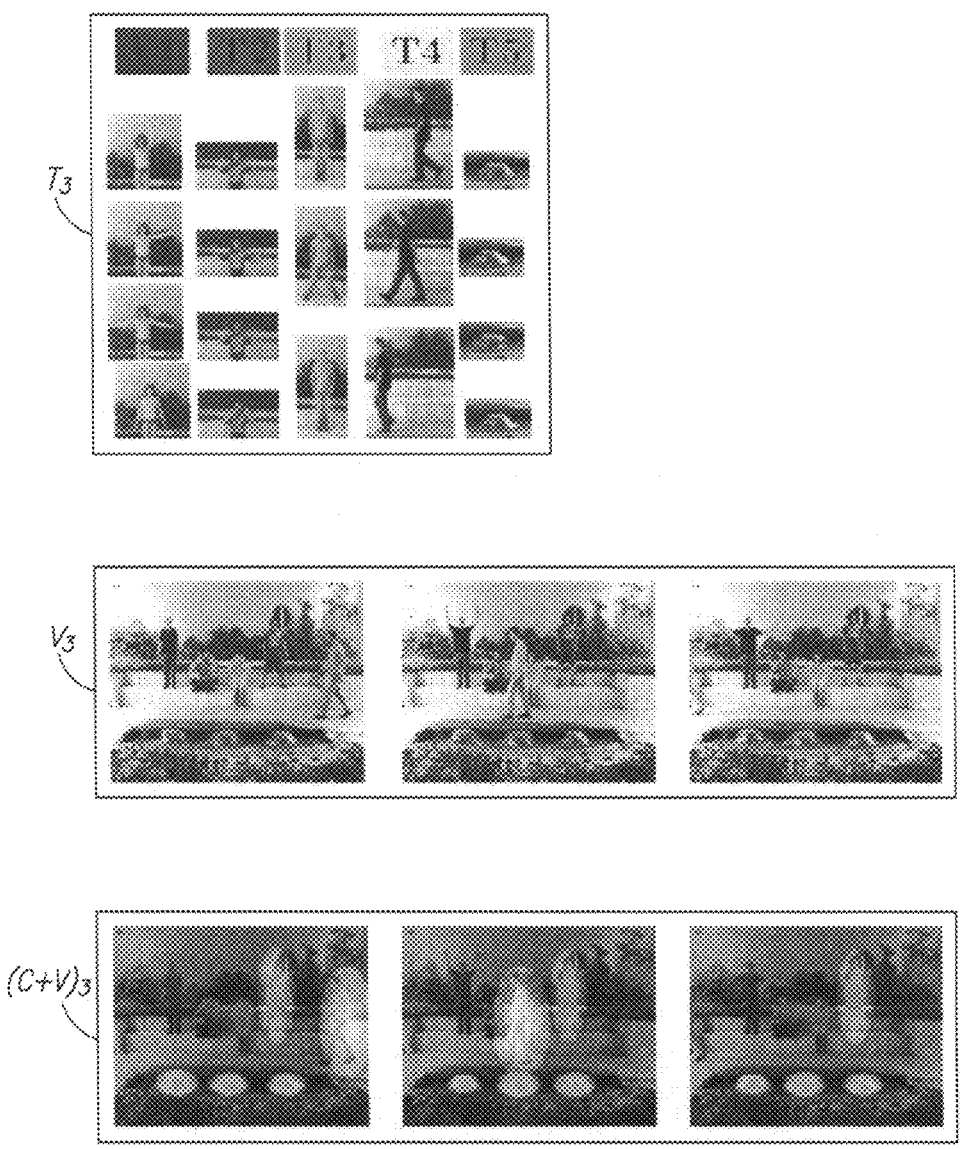
FIG. 8 is an illustration of the employment of the present invention to detect, in one video, instances of five different activities, each demonstrated in a separate video template.

FIG. 8 shows an example in which five different activities occurring simultaneously are detected. In this example, there are five space-time templates, $T_{3-1}$ through $T_{3-5}$, in each of which one of the five activities 'walk', 'wave', 'clap', 'jump' and 'fountain' is demonstrated. The motion in 'fountain' is flowing water. A series of a few sample frames of video $V_3$ against which templates $T_{3-1}$ through $T_{3-5}$ were correlated is shown in FIG. 8.

The series of frames denoted by reference numeral $(C+V)_3$ shows the peaks of the resulting space-time correlation volume $C_3(x,y,t)$ superimposed on $V_3$. As indicated by the bright patches highlighting the instances of the five template activities in frame series $(C+V)_3$, despite the different people performing the activities and the different backgrounds, all the activities, including the flowing water, were correctly detected.

It will be appreciated that, in regular image correlation, the search space is 2-dimensional (the entire image). In space-time correlation, in accordance with the present invention, the search space is 3-dimensional (the entire video sequence), and the local computations are more complex (e.g., eigenvalue estimations). Applicants have realized that special care must be taken regarding computational issues and have made the following observations in order to speed up the space-time correlation process significantly:

Firstly, the local matrices $M_{3\times3}$ may be computed and stored ahead of time for all pixels of all video sequences in the database, and separately for the space-time templates (the video queries). The only matrices which require online estimation during the space-time correlation process may be the combined matrices $M_{12}$ (Eq. 7), which result from comparing ST-patches in the template with ST-patches in a database sequence. This, however, may not require any new gradient estimation during run-time, since $M_{12}=M_1+M_2$.

Secondly, the rank-increase measure (Eq. 12) may be approximated in order to avoid eigenvalue computation, which is computationally expensive when applied to $M_{12}$ at every pixel. The rank-increase measure may be approximated in accordance with the following:

Since $\det(M)=\lambda_1\cdot\lambda_2\cdot\lambda_3$, and $\det(M^\diamond)=\lambda_1^\diamond\cdot\lambda_2^\diamond$, the rank-increase measure of Eq. (12) may be rewritten as:

$$\Delta r = \frac{\lambda_2 \cdot \lambda_3}{\lambda_1^\diamond \cdot \lambda_2^\diamond} = \frac{\det(M)}{\det(M^\diamond) \cdot \lambda_1}$$

If $\|M\|_F=\sqrt{\Sigma M(i,j)^2}$ is the Frobenius norm of the matrix M, then the following relation holds between $\|M\|_F$ and $\lambda_1$:

$$\lambda_1 \leq \|M\|_F \leq \sqrt{3}\lambda_1$$

The scalar $\sqrt{3}$ ($\approx 1.7$) is related to the dimension of M ($3\times3$). The rank-increase measure $\Delta r$ can therefore be approximated by.

$$\Delta\hat{r} = \frac{\det(M)}{\det(M^\diamond) \cdot \|M\|_F}$$

$\Delta\hat{r}$ requires no eigenvalue computation, is easy to compute from M, and provides the following bounds on the rank-increase measure $\Delta r$ of Eq. 12:

$$\Delta\hat{r} \leq \Delta r \leq \sqrt{3}\Delta\hat{r}$$

Although less precise than $\Delta r$, $\Delta\hat{r}$ provides sufficient separation between 'rank-increases' and 'no-rank-increases'. In the analytic definition of the rank increase measure (Eq. 12), Applicants have realized that $\Delta r$ attains high values in case of a uniform patch (where all eigenvalues might be equally small). In order to overcome this situation and to add numerical stability to the measure, Applicants added a small constant to the Frobenius norm in the denominator of the $\Delta\hat{r}$ equation that corresponds to 10 gray-level gradients: e.g.

$$\Delta\hat{r} = \frac{\det(M)}{\det(M^\diamond) \cdot (\|M\|_F + \varepsilon)}$$

This approximated measure may be used to speed-up the space-time correlation process provided by the present invention.

Finally, when searching only for correlation peaks, there may be no need to compute the full "correlation volume". Instead, the method may be sped-up by using coarse-to-fine multi-grid search using a smoothness property of the "correlation volume", as follows:

Initially, the resolution of segment S and template T is reduced a number of times and the multiple resolutions may be formed into "space-time Gaussian pyramids". The reduction in the spatial and the temporal resolutions in each level do not have to be the same. Then, the method may perform a fill search in the coarsest resolution level to find several peaks of behavior correlation above some pre-defined threshold. The locations of the peaks may be found by a common technique (e.g., "non-maximal suppression") and their total number may be limited for further efficiency.

The locations of the peaks may be translated to the next level of higher resolution and a new search may be performed only in a small space-time neighborhood around each peak, to refine its location. Any refined peaks that do not pass a threshold in the higher level may be pruned from the list of peaks. The search process may proceed in a similar manner to the next levels until the final search in the finest resolution level yields the exact locations of the highest correlation peaks in segment S.

Another possible speed-up relates to the number of patches in template T that are computed and that contribute to the final correlation score C(T,S), as indicated hereinabove. In the alternative embodiment, instead of taking patches around all pixels in template T (and their matching patches from video segment S), the method may take only a subset of patches that represent template T. This subset may be chosen in a sparse space-time grid of locations in template T. This grid may be distributed homogeneously/regularly (e.g. every two pixels and two frames assuming a large overlap between neighboring patches) or inhomogeneously/irregularly by, for example, sampling pixels in regions of large gradients and/or large motion.

It will be appreciated that the method of the present invention may be utilized for other applications in addition to the action recognition and detection discussed hereinabove.

In one embodiment, the method may be utilized for automatic sequence matching and registration of two or more sequences containing the same or a similar human action or other dynamic behavior by compensating for a global space-time parametric transformation. The space-time parametric transformation between the sequences can be found (e.g. in "Aligning Sequences and Actions by Maximizing Space-Time Correlations", Y. Ukrainitz and M. frani, ECCV 2006) using the behavioral correlation measure of the present invention alone or in combination with other measures. The residual non-parametric inconsistency after the parametric registration can be used as a measure for spotting differences/misalignments between actions or dynamic events. These residual differences can be used, for example, for identifying the identity of a person by the way they walk (or do other actions).

In another embodiment, the method may be utilized for video search, indexing, or "Intelligent Fast-Forward" (i.e. moving to the next instance of the behavioral phenomenon of template T). All of these applications may involve searching for instances of a given behavior in a small video clip in a large and long video. The search may be sped up by construction of a search tree or other data structure in a pre-process step.

In a further embodiment, the method may be utilized for spatio-temporal clustering and video segmentation into sequences of similar behaviors and/or similar camera-motions. The behavior-based measure of the present invention, generated in step 22, may be used directly or using the following extension to construct an affinity matrix between regions/pixels in the video based on the consistency of their motions.

In this embodiment, a basic set of patches with basic motions for basic structures may be defined. For example, the basic patches might be of a structure, such as a corner, an edge, etc., moving in a set of pre-defined directions (e.g. 0°, 90°, 180°, 270°) with different velocities (e.g., 0.5, 1.0, 1.5 pixels/frame). A "basis vector" may be defined for these patches and each patch of video segment S may be compared to this vector.

The motion consistency of a given patch with these basic patches, rather than with template T, may be determined and a vector of measurements may be obtained for the given patch. The above example may provide a vector with 13 elements for the 4 directions, 3 velocities and one static patch. These "feature vectors" represent the local motion profile of the patch without computing the motion.

The motion consistency measure may then be a simple distance metric ($L_1$, $L_2$, $L_\infty$ or other) between feature vectors of two patches.

With this extension of the consistency measure, the method may then also comprise any standard method for clustering or segmentation, such as "Graph-cuts" (e.g. "Fast approximate energy minimization via graph cuts" by Y. Boykov, O. Veksler and R. Zabih, PAMI 2001), "Spectral Clustering" (e.g. "On Spectral Clustering: Analysis and an Algorithm" by A. Ng, M. Jordan and Y. Weiss, *NIPS* 2001), "Multiscale segmentation" (e.g., "Fast Multiscale Image Segmentation" E. Sharon, A. Brandt and R. Basri, *CVPR* 2000), or "Mean-Shift" (e.g., "Mean Shift: A Robust Approach Towards Feature Space Analysis" by D. Comaniciu and P. Meer, *PAMI* 2002). The result may be clustering or segmentation of the video sequence into regions of similar motions.

With the feature vectors, the method may also include the measurement and/or the comparison of the statistical dynamical properties of video data. In one embodiment, the method may construct histograms of the vectors in large regions with many patches. Regions with similar statistical distribution of motions may have similar histograms. Any standard distance measure on histograms (e.g., KL divergence, Chi-Square distance, Minimal Earth Distance) may then be used to compare the histograms. Such a method may be used to cluster a video sequence into different dynamical textures and stochastic motion (e.g., flowing water, foam, fire . . . ) or to compare two or more video sequences with these distributions of motions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for detecting at least one similar behavioral phenomenon in two space-time video segments, the method comprising:

for small space-time patches of pre-defined size around individual pixels of a corresponding pair of pixels across said two video segments, associating a local motion consistency measure between a pair of said space-time patches of said corresponding pair of pixels which determines whether or not said pair of patches could have resulted from the same underlying local motion without explicitly computing an underlying motion field; and from an aggregation of at least part of a plurality of said local motion consistency measures, determining the likelihood that said two space-time video segments could have resulted from the same underlying motion field, wherein said associating comprises calculating whether a vector $\bar{u}$ with a non-zero temporal component exists which is perpendicular to space-time gradients of pixel values in said corresponding space-time patches without explicitly computing said vector $\bar{u}$.

2. The method according to claim 1 and wherein said pixel values are at least one of the following: pixel intensities, pixel colors, filtered intensities, local SSD (sum of square differences) surfaces, correlation surfaces and normalized correlation surfaces.

3. The method according to claim 1 and wherein said corresponding space-time patches are locally shifted relative to each other.

4. The method according to claim 1 and wherein said associating comprises:

comparing said space-time patches to a set of representative patches to generate feature vectors; and determining motion consistency as a function of the distance between said feature vectors of said corresponding space-time patches.

5. The method according to claim 1 and wherein said associating comprises:

comparing said space-time patches to a set of representative patches to generate feature vectors; and determining motion consistency as a function of the distance between distributions of said feature vectors extracted from space-time corresponding regions within said video segments.

6. A method for detecting at least one similar behavioral phenomenon in two different space-time video segments, the method comprising:

for small space-time patches of pre-defined size around individual pixels of a corresponding pair of pixels across said two different video segments, determining local motion consistencies between said space-time patches of said corresponding pair of pixels without explicitly computing an underlying motion field, wherein said determining comprises:

calculating whether a vector $\bar{u}$ with a non-zero temporal component exists which is perpendicular to space-time gradients of pixel values in said corresponding space-time patches without explicitly computing said vector $\bar{u}$ and wherein said determining comprises calculating a rank increase between a 2×2 upper-left minor matrix of a 3×3 gram matrix of said space-time gradients and said 3×3 gram matrix; and from an aggregation of at least part of said local motion consistencies, measuring the likelihood that said two different space-time video segments could have resulted from a similar underlying motion field.

7. The method according to claim 6 and wherein said determining comprises calculating a continuous rank increase measure.

8. The method according to claim 7 and wherein said rank increase measure is approximate.

9. The method according to claim 1 wherein said determining the likelihood comprising:
aggregating local consistency scores into a global correlation score between said video segment and said video sequence;
determining a correlation volume of said video sequence with respect to said video segment; and
identifying peaks in said correlation volume, said peaks denoting locations in said video sequence where behavioral phenomena occur.

10. A method for detecting at least one similar behavioral phenomenon in two different space-time video segments, the method comprising:
for small space-time patches of pre-defined size around individual pixels of a corresponding pair of pixels across said two different video segments, determining local motion consistencies between said space-time patches of said corresponding pair of pixels without explicitly computing an underlying motion field, and wherein said determining comprises:
generating multiple resolutions of said video sequence and said video segment, wherein multiple resolutions are in at least one of space and time;
searching a coarse resolution of said video segment within a coarse resolution of said video sequence to find locations with high match values;
refining the search in a finer resolution around locations in said finer resolution corresponding to said locations in said coarse resolution; and
repeating said refined search until reaching a desired resolution level; and
from an aggregation of at least part of said local motion consistencies, measuring the likelihood that said two different space-time video segments could have resulted from a similar underlying motion field, wherein said measuring comprises:
aggregating local consistency scores into a global correlation score between said video segment and said video sequence;
determining a correlation volume of said video sequence with respect to said video segment; and
identifying peaks in said correlation volume, said peaks denoting locations in said video sequence where behavioral phenomena occur.

11. The method according to claim 1 and wherein said at least one phenomenon is at least one of the following types of phenomena: a dynamic behavior, an action, a rigid motion, and a non-rigid motion.

12. The method according to claim 1 and wherein said at least one phenomenon is a multiplicity of phenomena occurring within a field-of-view of a camera.

13. The method according to claim 1 and wherein an entity performing said at least one phenomenon in on of said video segment does not have the same appearance as an entity performing a phenomenon similar to said at least one phenomenon in the other of said video segments.

14. The method according to claim 13 and wherein said entity is at least one of the following: a person, an animal, a rigid object, a non-rigid object.

15. The method according to claim 1 wherein said determining the likelihood is employed for at least one of the following: video search, indexing and fast forward to a next phenomenon of said behavioral phenomenon.

16. The method according to claim 1 and wherein said determining the likelihood is employed for automatic video sequence registration or alignment.

17. The method according to claim 1 and wherein said is determining the likelihood is employed for action based identification of an entity.

18. The method according to claim 13 and wherein said entity is at least one of the following: a person, an animal, a rigid object, a non-rigid object.

19. The method according to claim 1 wherein said identifying is employed for spatio-temporal clustering.

20. The method according to claim 1 and wherein said determining the likelihood is employed for segmenting video into sequences of similar phenomena.

21. The method according to claim 6, wherein said calculating comprising:
evaluating said rank-increase as a function of the discrepancy between the eigenvalues of said gram matrix and said minor matrix.

22. The method according to claim 21 and wherein said function comprises the ratio between the product of the three eigenvalues of said gram matrix and the two eigenvalues of said minor matrix.

23. The method according to claim 21 and wherein said function comprises the difference between the sum of the three eigenvalues of said gram matrix and the two eigenvalues of said minor matrix.

24. The method according to claim 21 and wherein said function comprises calculating the following:

$$\Delta r = \frac{\lambda_2 \cdot \lambda_3}{\lambda_1^\diamond \cdot \lambda_2^\diamond}$$

where said eigenvalues of said gram matrix are $\lambda_1 \geq \lambda_2 \geq \lambda_3$, and the eigenvalues of said minor matrix are $\lambda_1^\diamond \geq \lambda_2^\diamond$.

25. A processor for detecting at least one similar behavioral phenomenon in two space-time video segments, the processor comprising:
a determiner to associate, for small space-time patches of pre-defined size around individual pixels of a corresponding pair of pixels across said two video segments, a local motion consistency measure between a pair of said space-time patches of corresponding pair of pixels which determines whether or not said pair of patches could have resulted from the same underlying local motion without explicitly computing an underlying motion field; and
a likelihood measurer to measure the likelihood, from an aggregation of at least part of said local motion consistency measures, that said two space-time video segments could have resulted from the same underlying motion field,
wherein said determiner comprises a calculator to calculate whether a vector $\bar{u}$ with a non-zero temporal component exists which is perpendicular to space-time gradients of pixel values in said corresponding space-time patches without explicitly computing said vector $\bar{u}$.

* * * * *